Patented July 26, 1949

2,477,487

UNITED STATES PATENT OFFICE 2,477,487

DISAZO PYRAZOLONE DYES

Georges Kopp, Mont Saint-Aignan, and René Gangneux, Rouen, France, assignors to Societe Anonyme de Matieres Colorantes et Produits Chimiques Francolor, Paris, France, a corporation of France No Drawing. Application June 25, 1945, Serial No. 601,542. In France January 13, 1944

Section 1, Public Law 690, August 8, 1946
Patent expires January 13, 1964

4 Claims. (Cl. 260—160)

It is well known that the acylacetylated derivatives of the aromatic amines can be used for the preparation of acid azo dystuffs; however their use is usally limited to the production of yellow shades, which considerably restrains their use.

Now, we have found that one obtains valuable acid polyazo dyestuffs by using as intermediary coupling agents, instead of the primary amines which couple in para position, products of the following general formula:

(I)
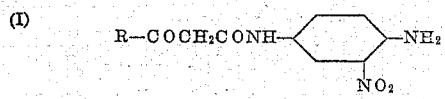

in which the benzenic nucleus as shown may contain other substituents such as the halogen atoms, the alkoyl or alkoxy groups and in which R represents a hydrocarbon radical.

The so obtained new dyestuffs answer the following formula:

(II)
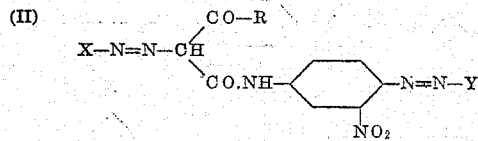

in which X represents the radical of an aromatic amine or of an amine behaving in diazotization like an aromatic amine, and containing at least one group $SO_3H$; Y represents any coupling agent, X and Y containing at least two groups $SO_3H$ or at least one group $SO_3H$ and one function $SO_2NH_2$; R has the same definition as in the first formula.

The said new dyestuffs can be obtained in the following manner: one couples diazo compounds of aromatic amines or of amines behaving in diazotization like aromatic amines, and containing at least one group $SO_3H$ with products corresponding to the first formula. Thus, monoazo products of the following general formula are obtained (III)
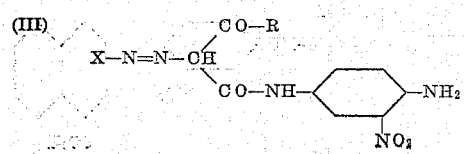

the said dyestuffs being diazotized and coupled with any coupling agents.

As initial diazotizable components one can use the amines of the benzenic, naphthalenic or amino-azo series, certain heterocyclic amines, all the said amines containing at least one group $SO_3H$ and being contingently substituted by the halogen atoms or other groups or functions such as alkyl, alkoxy, $CO_2H$—$CON<$, —$SO_2N<$, OH or the like.

As final coupling agents capable of being used according to the present invention one can quote by way of examples: the betadiketones, the arylides of acylacetic acids, pyrazolones, benzenic or naphthalenic amines, phenols or napthtols, diphenols, aminophenols, aromatic diamines, aminonaphthols, as well as the monoazo dyestuffs capable of coupling; all these coupling agents may be substituted or not by halogen atoms, groups of functions such as alkyl, alkoxy, $SO_3H$, $SO_2N<$, $CO_2H$, COH and the like.

The initial component of the dyestuff and the final coupling agent should contain a total of at least two groups $SO_3H$ or at least one group $SO_3H$ and one function $SO_2NH_2$.

The middle or intermediary coupling agents can be obtained according to the method described in the Kopp et al. patent application, filed on June 25, 1945, Serial No. 601,541, now abandoned, for a "Method for the preparation of mono-acylacetylated derivatives and products resulting therefrom," which consists in condensing with an acylacetic acid ester an amine of the following general formula:

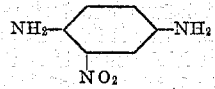

the said amine contingently containing other substituents fixed on the benzenic nucleus such as the halogen atoms, the alkyl or alkoxy groups.

The dyestuffs according to the invention, the shades of which go from reddish yellow to green over orange, red, violet and brown, dye animal or animalized fibres; they possess excellent general fastnesses, preserve the cellulosic fibres perfectly and dye natural silk to the same height as wool.

Among the said dyestuffs the orange and brown ones are of interest because they make it possible to fill gaps in the scale of acid azo dystuffs.

Indeed, the absence of intermediary coupling agents between the pyrazolones and the beta-naphthol makes it very difficult to obtain yellowish orange shades, while the latter can be easily obtained by means of the present method. The same it true for obtaining the brown shades which heretofore, have been mostly obtained by means of dyestuff mixtures.

The following are non-limitative examples illustrating the present invention

Example 1

173 parts of sulphanilic acid are diazotized in the usual manner and the solution of the diazo is poured rapidly into a solution obtained by dissolving 237 parts of 4-amino-3-nitro-acetoacetanilide (prepared as described hereafter) in 3,000 parts of icy water by means of 115 parts of caustic soda of 35° Bé. and by adding 300 parts of crystallized acetate of soda. The coupling is rather rapid and the resulting dyestuff, which is colloidal at first, becomes rapidly crystalline. When the coupling has come to an end the formation is rendered acid through an addition of hydrochloric acid. 200 parts of hydrochloric acid of 19° Bé. are still added and one diazotizes by pouring during about half an hour 138 parts of sodium nitrite in solution at 50%. The diazotization is rapid and the diazo derivative precipitates in totality. The so obtained azodiazo compound is poured rapidly into a solution containing 288.5 parts of 1-(2'-chloro-5'-sulpho) phenyl-3-methyl-5-pyrazolone, 3,000 parts of icy water, 115 parts of caustic soda of 35° Bé. and 450 parts of crystallized acetate of soda.

The resulting dyestuff, isolated in the usual manner, dyes animal fibres in yellowish orange which is very fast to light. This dyestuff has for its formula:

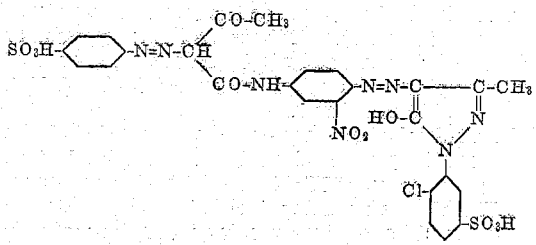

The preparation of the 4-amino-3-nitro-acetoacetanilide is effected as follows:

153 parts of nitro-paraphenylene-diamine, 500 parts of monochlorobenzene and 200 parts of freshly distilled acetoacetate of ethyl are heated during two hours to a soft ebullition while removing through distillation the alcohol which has formed in the course of the reaction. After a cooling of 24 hours the layer of the solvent is separated from the half-tarry and half-crystalline product which deposits. This precipitate is taken again in 1900 parts of boiling acetic acid of 40%. 5 parts of carboraffine are added; one filters and allows to crystalline through cooling.

Example 2

253 parts of aniline-2-5-disulphonic acid are diazotized and the obtained diazo derivative is poured into a solution of 4-amino-3-nitro-acetoacetanilide identical with that of Example 1. The coupling being complete, one acidifies through an addition of hydrochloric acid of 19° Bé. and further adds 200 parts of hydrochloric acid of 19° Bé. One diazotizes by pouring in half an hour 138 parts of sodium nitrite in solution at 50%. The diazo compound which is first entirely in solution crystallizes partially. It is poured rapidly into a solution obtained by dissolving 177 parts of acetoacetanilide into 3,000 parts of water by means of 115 parts of caustic soda and by adding 450 parts of sodium acetate.

The resulting dyestuff dyes animal fibres in yellow with an excellent fastness to light. This dyestuff has for its formula:

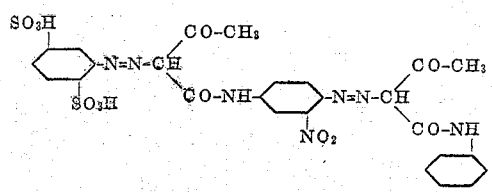

Example 3

One diazotizes 303 parts of Freund 1-3-8 acid and pours the diazo into a solution obtained by dissolving 271.5 parts of 4-amino-3-nitro-6-chloro-acetoacetanilide (prepared by condensing as in Example 1 acetoacetate of ethyl with 2.5 diamino-4-nitro chlorobenzene) in 3000 parts of icy water by means of 115 parts of caustic soda of 35° Bé. and by adding 300 parts of crystallized sodium acetate. The resulting dyestuff is rendered acid through an addition of hydrochloric acid. One further adds 200 parts of hydrochloric acid of 19° Bé. and diazotizes by pouring during one hour 138 parts of sodium nitrite in solution at 50%. The azodiazo compound is poured rapidly into a solution obtained by dissolving 174 parts of 1-phenyl-3-methyl-5-pyrazolone in 3,000 parts of icy water by means of 715 parts of caustic soda of 35° Bé. and by adding 450 parts of crystallized sodium acetate.

The dyestuff, isolated in the usual manner, dyes animal fibres in orange very fast to light. This dyestuff has for its formula:

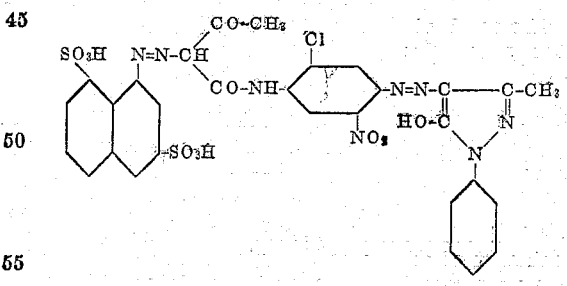

Example 4

In Example 1 the 1-(2'-chloro-5'-sulpho)-phenyl-3-methyl-5-pyrazolone is substituted by 223 parts of 1-naphthol-4-sulphonic acid and the sodium acetate used for said coupling is substituted by 240 parts of sodium carbonate.

The resulting dyestuff dyes animal fibres in pure red having a good fastness. This dyestuff has for its formula:

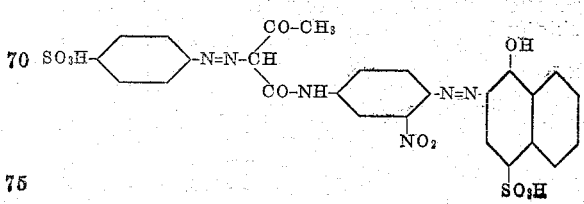

Example 5

In Example 4 the Neville-Winter acid is substituted by 315 parts of 2-phenylamino-8-oxy-naphthalene-6-sulphonic acid. The dyestuff, isolated in the usual manner dyes animal fibres in yellowish brown very fast to washing, to fuller, to sulphur and to sweat. This dyestuff has for its formula:

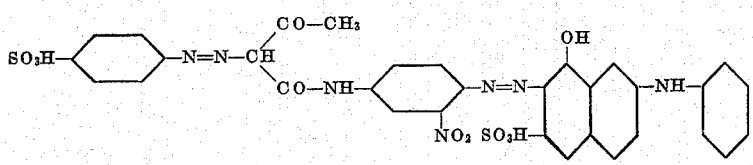

Example 6

In Example 4 the Neville-Winter acid is substituted by 512 parts of the dyestuff obtained by coupling the diazo derivative of the paranitraniline with the H acid in an acid medium. The resulting dyestuff dyes animal fibres in a pure green of good fastness. This dyestuff has for its formula:

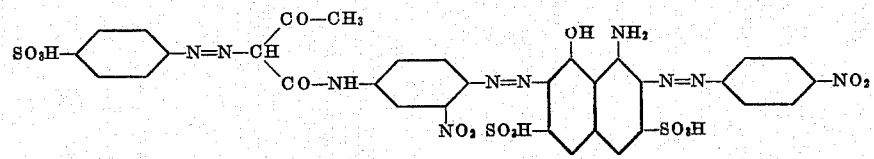

What we claim is:

1. The method of preparing disazodyestuffs for dyeing animal fibers in yellowish orange shades, which consists in coupling a diazotized benzenic amine carrying at least one SO₃H group with an acylacetylated derivative of the general formula:

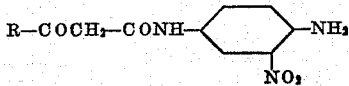

in which R represents an alkyl radical, diazotizing the aminoazo compound obtained, and coupling the diazo-compound thus obtained with a sulfonated derivative of pyrazolone.

2. The method of preparing disazodyestuffs for dyeing animal fibers in yellowish orange shades, which consists in coupling a diazotized benzenic amine carrying at least one SO₃H group with the acetylated benzenic derivative of the following formula:

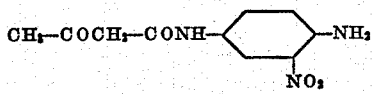

diazotizing the aminoazo compound obtained, and coupling the diazo compound thus obtained with 1-(2'-chloro-5'-sulpho) phenyl-3-methyl-5-pyrazolone.

3. A disazodyestuff for dyeing animal fibers in yellowish orange shades and having the general formula:

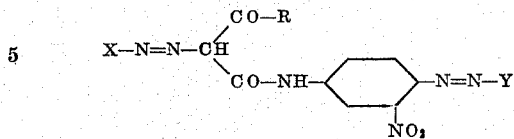

wherein X represents the radical of a diazotized benzenic amine, carrying at least one SO₃H group, Y represents the radical of a sulfonated derivative of a pyrazolone and R represents an alkyl radical.

4. The disazo dyestuff for dyeing animal fibers in yellowish orange shades and having the formula:

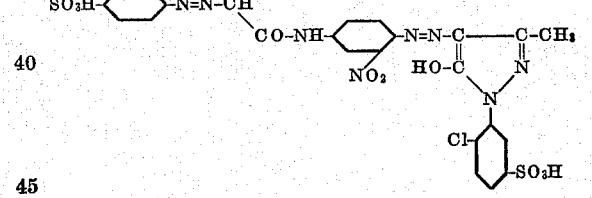

GEORGES KOPP.
RENÉ GANGNEUX.

REFERENCES CITED

The following references are of record in the file of this patent:

UNITED STATES PATENTS

| Number | Name | Date |
|---|---|---|
| 1,594,865 | Zitscher | Aug. 3, 1926 |
| 1,982,332 | Taube | Nov. 27, 1934 |
| 2,100,378 | Carr | Nov. 30, 1937 |
| 2,230,696 | Petersen | Feb. 4, 1941 |

FOREIGN PATENTS

| Number | Country | Date |
|---|---|---|
| 393,267 | Germany | Mar. 31, 1924 |

OTHER REFERENCES

Georgievics and Grandmougin, Textbook of Dye Chemistry, pages 7, 94 (1920).